United States Patent
Gröppel et al.

(10) Patent No.: US 9,984,796 B2
(45) Date of Patent: May 29, 2018

(54) INSULATION SYSTEMS WITH IMPROVED RESISTANCE TO PARTIAL DISCHARGE, PRODUCTION METHOD FOR THIS

(75) Inventors: Peter Gröppel, Erlangen (DE); Dieter Heinl, Weisendorf (DE); Christian Meichsner, Buttenheim (DE); Igor Ritberg, Fürth (DE)

(73) Assignee: SIEMENS AKTIENGESELLSCHAFT (DE)

( * ) Notice: Subject to any disclaimer, the term of this patent is extended or adjusted under 35 U.S.C. 154(b) by 900 days.

(21) Appl. No.: 14/241,801

(22) PCT Filed: Sep. 3, 2012

(86) PCT No.: PCT/EP2012/067116
§ 371 (c)(1),
(2), (4) Date: Jun. 5, 2014

(87) PCT Pub. No.: WO2013/045212
PCT Pub. Date: Apr. 4, 2013

(65) Prior Publication Data
US 2015/0101845 A1    Apr. 16, 2015

(30) Foreign Application Priority Data
Sep. 26, 2011  (DE) .......................... 10 2011 083 409

(51) Int. Cl.
*H01B 13/30* (2006.01)
*H01B 3/42* (2006.01)
(Continued)

(52) U.S. Cl.
CPC .............. *H01B 13/30* (2013.01); *B32B 1/08* (2013.01); *B32B 7/12* (2013.01); *H01B 3/04* (2013.01);
(Continued)

(58) Field of Classification Search
CPC ... H01B 3/04; H01B 3/40; H01B 3/42; H01B 13/06; H01B 13/08; H01B 13/26;
(Continued)

(56) References Cited

U.S. PATENT DOCUMENTS

| 2005/0096423 | A1 | 5/2005 | Jennrich et al. |
| 2007/0141324 | A1* | 6/2007 | Stevens ............... H01B 3/025 428/324 |
| 2007/0191513 | A1 | 8/2007 | Jenrich ................. 523/443 |
| 2011/0098383 | A1 | 4/2011 | Albert ................... 523/457 |

FOREIGN PATENT DOCUMENTS

| CN | 101506301 A | 8/2009 |
| DE | 103 45 139 A1 | 4/2005 |

(Continued)

OTHER PUBLICATIONS

International Search Report dated Jan. 25, 2013 issued in corresponding International patent application No. PCT/EP2012/067116.
(Continued)

*Primary Examiner* — Walter B Aughenbaugh
(74) *Attorney, Agent, or Firm* — Ostrolenk Faber LLP

(57) ABSTRACT

An insulating system having improved partial discharge resistance includes an insulating tape around a conductor. The tape is a mica tape joined to a carrier. The tape is impregnated with a synthetic resin, and is interspersed with a nanoparticulate filler, present bimodally, in the form of two fractions of the filler differing in particle size and fraction size. An adhesion promoter may be in the resin.

14 Claims, 2 Drawing Sheets

(51) Int. Cl.

| | | |
|---|---|---|
| *B32B 7/12* | (2006.01) | |
| *B32B 1/08* | (2006.01) | |
| *H01B 13/26* | (2006.01) | |
| *H01B 13/08* | (2006.01) | |
| *H01B 3/40* | (2006.01) | |
| *H01B 3/04* | (2006.01) | |
| *H01B 13/06* | (2006.01) | |
| *H01F 41/068* | (2016.01) | |
| *B82Y 30/00* | (2011.01) | |
| *H01F 41/12* | (2006.01) | |

(52) U.S. Cl.
CPC ............... *H01B 3/40* (2013.01); *H01B 3/42* (2013.01); *H01B 13/06* (2013.01); *H01B 13/08* (2013.01); *H01B 13/26* (2013.01); *H01F 41/068* (2016.01); *B82Y 30/00* (2013.01); *H01F 41/127* (2013.01); *Y10T 428/1393* (2015.01)

(58) Field of Classification Search
CPC .. H01B 13/30; B32B 1/08; B32B 7/12; Y10T 428/1393
See application file for complete search history.

(56) References Cited

FOREIGN PATENT DOCUMENTS

| | | |
|---|---|---|
| DE | 102008030904 A1 | 12/2009 |
| DE | 102009053253 A1 | 5/2011 |
| EP | 2 058 366 A1 | 5/2009 |
| WO | WO 2008/129032 A1 | 10/2008 |
| WO | WO 2011/095208 A1 | 8/2011 |
| WO | WO 2011/131537 A2 | 10/2011 |

OTHER PUBLICATIONS

Written Opinion dated Jan. 25, 2013 issued in corresponding International patent application No. PCT/EP2012/067116.
Takahiro Imai, Fumio Sawa, Tamon Ozaki, Toshio Shimizu, Ryouichi Kido, Masahiro Kozako and Toshikatsu Tanaka; "Evaluation of Insulation Properties of Epoxy Resin with Nano-scale Silica Particles", Toshiba Research Cooperation.
Chinese Office Action, dated Jun. 24, 2015, issued in corresponding Chinese Patent Application No. 201280046990.1. English translation. Total 20 pages.

\* cited by examiner

INSULATION SYSTEMS WITH IMPROVED RESISTANCE TO PARTIAL DISCHARGE, PRODUCTION METHOD FOR THIS

CROSS-REFERENCE TO RELATED APPLICATIONS

The present application is a 35 U.S.C. §§ 371 national phase conversion of PCT/EP2012/067116, filed Sep. 3, 2012, which claims priority of German Patent Application No. 10 2011 083 409.5, filed Sep. 26, 2011, the contents of which are incorporated by reference herein. The PCT International Application was published in the German language.

FIELD OF THE INVENTION

The present invention pertains generally to the field of the insulation of electrical conductors against partial discharge, and specifically to a method for producing an insulating system having improved partial discharge resistance and to an insulating system having improved partial discharge resistance.

TECHNICAL BACKGROUND

In rotating electrical machines, such as motors or generators, the reliability of the insulating system is critically responsible for their operational integrity. The insulating system has the function of electrically insulating electrical conductors (wires, coils, bars) durably from one another and from the laminated stator core or the environment. Within high-voltage insulation, distinctions are made in insulation between partial conductors (partial conductor insulation), between the conductors or windings (conductor or winding insulation), and between conductor and ground potential in the slot and winding head region (main insulation). The thickness of the main insulation is adapted both to the nominal voltage of the machine and to the operational and fabrication conditions. The competitiveness of future plants for energy production, their distribution and utilization, is critically dependent on the materials employed and technologies applied for the insulation.

The fundamental problem with insulators loaded electrically in this way lies in the so-called partial discharge-induced erosion with formation of what are called "treeing" channels, which lead ultimately to the electrical breakdown of the insulator.

High-voltage and medium-voltage machines currently employ what are called impregnated laminar mica insulation systems. In these systems, the form-wound coils and conductors produced from the insulated partial conductors are enwound with mica tapes and impregnated with synthetic resin preferably in a vacuum pressure impregnation (VPI) process. The combination of impregnating resin and the carrier tape of the mica provides the present mechanical strength and also the required partial discharge resistance of the electrical insulation.

Mica paper is converted, in line with the requirements of the electrical industry, into a more stable mica tape. This is done by bonding the mica paper to a carrier material having a high mechanical strength, by means of an adhesive. A feature of the adhesive is preferably that it has a high strength at room temperature, in order to ensure the join between mica and carrier, and passes into a liquid state at elevated temperatures (60° C.-150° C.). This allows it to be applied as an adhesive at elevated temperature in liquid form or in a mixture with a volatile solvent. After cooling has taken place or the solvent has been removed, the adhesive is present in a solid yet flexible form, and allows the mica tape to be applied, for example, around Roebel bars consisting of partial conductors and form-wound coils at room temperature, with the adhesive properties of the adhesive preventing delaminations of the mica paper from the carrier material. The resulting mica tape is wound in a plurality of plies around electrical conductors.

High-voltage and medium-voltage motors and generators employ laminar mica insulation systems. In these systems, the form-wound coils produced from the insulated partial conductors are enwound with mica tapes and impregnated with synthetic resin primarily in a vacuum pressure impregnation (VPI) process. In this case, mica is used in the form of mica paper, and as part of the impregnation the cavities located between the individual particles in the mica paper are filled with resin. The combination of impregnating resin and carrier material of the mica provides the mechanical strength of the insulation. The electrical strength comes about from the multiplicity of solid-solid interfaces in the mica used. The resulting layering of organic and inorganic materials forms microscopic interfaces whose resistance to partial discharge and thermal stresses is determined by the properties of the mica platelets. As a result of the complicated VPI process, even very small cavities in the insulation must be fully filled with resin, in order to minimize the number of internal gas-solid interfaces.

For the additional improvement of the resistance, the use of nanoparticulate fillers is described. See PCT International Application No.: PCT/EP2012/067141.

The combination of impregnating resin and the carrier tape of the mica provides the present mechanical strength and also the required partial discharge resistance of the electrical insulation.

As well as the VPI process, there is also the Resin Rich technology for producing and impregnating the mica tape, in other words the insulating tape and then, subsequently, the insulating system.

The main difference between these two technologies is the construction and manufacture of the actual insulating system of the coils. Whereas the VPI system is complete only after the impregnation and after the curing of the winding in a forced air oven, the leg of the Resin Rich coil, cured separately under temperature and pressure, constitutes a functioning and testable insulating system even before installation into the stator.

The VPI process operates with porous tapes, forming a solid and continuous insulating system under vacuum with subsequent exposure of the impregnating vessel to overpressure after curing in the forced air oven.

In contrast to this, the manufacture of Resin Rich coils is more complex, since each coil leg or winding bar has to be manufactured individually in specific baking presses, leading to a specific increase in the costs of the individual coil.

In this context, mica tapes are employed that are impregnated with a polymeric insulating substance which is present at what is called a B-stage. This means that the polymer, usually aromatic epoxy resins (BADGE, BFDGE, epoxidized phenol novolaks, epoxidized cresol novolaks, and anhydrides or amines as hardeners), is partially crosslinked and is thus in a tack-free state, but on further heating is able to melt again and be ultimately cured, so as to be brought into the final shape. Since the resin is introduced in an excess, it is able, during the final pressing operation, to flow into all cavities and voids, in order to attain the corresponding quality of insulation. Excess resin is pressed out of the system by the pressing operation.

From the literature it is known that the use of nanoparticulate fillers in polymeric insulating substances leads to significant improvements in the insulation in respect of the electrical longevity.

A disadvantage of the known systems, especially of those based on epoxy resins, is the rapid degradation of the polymeric matrix on exposure to partial discharge, here referred to as erosion. Implementing the polymer matrix with erosion-resistant nanoparticles (aluminum oxide, silicon dioxide) causes its exposure, brought about by incipient breakdown of the polymer, referred to as polymer degradation.

SUMMARY OF THE INVENTION

It is the object of the present invention to enable an insulating system having improved partial discharge resistance.

In one aspect of the invention, a method for producing an insulating system having improved partial discharge resistance, comprises the following method steps:
  providing an insulating tape which comprises a mica paper and a carrier material, which are bonded to one another by means of an adhesive,
  enwinding an electrical conductor with the insulating tape, and
  impregnating the insulating tape wound around the conductor with synthetic resin, the synthetic resin comprising a nanoparticulate filler, wherein the nanoparticulate filler is present at least bimodally.

"Bimodal" in the present context means that the nanoparticulate filler is present in two different fractions. It is possible for the fractions to be formed of two different materials and/or of two different sizes of the nanoparticulate filler.

According to one preferred aspect of the invention, the two fractions are present in the same material but the particles in each of the two fractions are of different respective size. Here it is preferred for the particles in the two fractions to differ significantly in their average sizes, that is there is an at least 5 nm or more difference between the minimum particle size of the larger particle size fraction and the maximum particle size of the smaller particle size fraction. For example, the bimodal nanoparticulate filler is formed from one fraction of nanoparticles which have on average a particle diameter of 10 to 50 nm, preferably of 12 to 40 nm, and especially preferably of 15 to 30 nm, and of a second fraction of nanoparticles which have on average a particle diameter of less than 7 nm, preferably less than 5 nm.

According to a further aspect of the invention, an insulating system having improved partial discharge resistance is presented, having an insulating tape which is wound around an electrical conductor and comprises a mica tape joined to a carrier material, and the insulating tape is impregnated with a synthetic resin, wherein the impregnated insulating tape is interspersed with a nanoparticulate filler which is present at least bimodally.

It is known that in contrast to polymeric insulating substance, inorganic particles are not destroyed or damaged, or only to a very limited extent, on exposure to partial discharge. The resultant erosion inhibition effect of the inorganic particles here is dependent on factors including the particle diameter and the particle surface which generates from it. It is found here that the greater the specific surface area of the particles, the greater the erosion inhibition effect on the particles. Inorganic nanoparticles have very high specific surface areas, at 50 g/m2 or more.

This correlation was first established in the Multi Core model of Prof. Tanaka in Tanaka et al., Dependence of PD Erosion Depth on the Size of Silica Fillers; Takahiro Imai*, Fumio Sawa, Tamon Ozaki, Toshio Shimizu, Ryouichi Kido, Masahiro Kozako and Toshikatsu Tanaka; Evaluation of Insulation Properties of Epoxy Resin with Nano-scale Silica Particles, Toshiba Research Cooperation.

Generally speaking, an unfilled or mica-based insulating substance based on epoxy resins exhibits rapid degradation of the polymeric matrix on exposure to partial discharge.

Implementing the polymer matrix with erosion-resistant, nanoparticulate filler (aluminum oxide, silicon dioxide) results in exposure of the nanoparticulate filler, caused by polymer degradation.

As the duration of erosion increases, a firmly adhering, sheetlike layer is gradually formed on the surface of the test element, consisting of exposed nanoparticulate filler. As a result of this particle crosslinking of the nanoparticulate filler, caused by the eroded polymer, the surface is passivated and the polymer beneath the passivation coat is effectively protected from further erosion under partial discharge exposure.

Surprisingly it has been found that through the use of bimodal nanoparticulate fillers in the synthetic resin, in particular of two fractions which differ significantly in terms of their average particle size, it has been possible to inhibit erosion in an improved manner.

It has been possible to show that the use of at least two different fractions of nanoparticles that differ significantly in their particle diameter leads to nanocomposites which exhibit particularly pronounced erosion resistance. The reason for this lies in the simplified formation of passivating layers, more particularly in the presence of adhesion promoters. Under the influence of partial discharges, there is agglomeration of the nanoparticles through chemical or physical processes, ending in a passivating protective layer. The combination of two different-sized nanoparticles supports this process, since the nanoparticles with the smaller diameter and, correspondingly, increased active surface area, under the influence of PD, support the agglomeration of the larger nanoparticles, resulting in an extremely erosion-resistant layer.

Elucidated below are possible basic principles for an advantageously improved erosion resistance through the use of bimodal nanoparticulate filler in the resin formulation: First, the concentration of nanoparticles with the smaller diameter can be kept low as compared with the concentration of nanoparticles with the larger diameter. This is valuable not only economically but also from a chemical and process engineering standpoint, since properties such as viscosity, reactivity, and storage stability are easier to control. Secondly, it is possible to utilize the positive properties, such as the high specific surface area of relatively small nanoparticles, for example.

In accordance with the invention, particularly advantageous embodiments result with reactive resin formulations constructed from the following components:

The resin basis is formed, for example, by an epoxy resin and/or a polyurethane resin.

The hardener comprises an anhydride, an aromatic amine and/or an aliphatic amine, for example, as functional group.

The nanoparticulate filler is preferably a material based on silicon dioxide and/or aluminum dioxide ($Al_2O_3$) and is at least bimodal, meaning that it is present in two fractions.

The two fractions in question are preferably fractions which differ in particle size. The fraction of the larger particles is preferably present in a higher concentration than the fraction of the smaller particles. Having proven especially advantageous is a combination of a nanoparticulate filler having a particle size of between 10 and 50 nm in a concentration of 10 to 50 wt % in the synthetic resin, together with a fraction of nanoparticulate filler having a particle size of between 1 and 5 nm in a concentration between 1 and 10 wt %.

The spectrum of materials for the nanoparticulate fillers that can be used is very broad. In principle it is possible here to use all sinterable materials.

Further fillers, additives, and pigments may be present.

The adhesion promoter is preferably an organic silicon compound, such as an organosilane and/or POSS. They are present in the synthetic resin—again preferably—at a concentration of between 0.1 and 45 wt %, more particularly of 1-25 wt %.

The use of adhesion promoters such as organic silicon compounds in the form of a coating of the fillers are added or also as part of the resin formulation in combination with the stated components. The latter offers the following advantage—that the use of adhesion promoter, namely, for example, silane as part of the reactive resin is possible in higher concentrations than when using silanes as adhesion promoters of the particles before the addition to the reactive resin.

DESCRIPTION OF EMBODIMENTS

Figure 1:
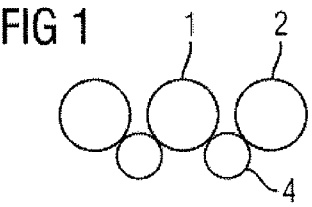
FIG 1 shows schematically a general mechanism for in situ sintering, using a bimodal nanoparticulate filler as an example.

FIG. 1 shows schematically a general mechanism for in situ sintering, using a bimodal nanoparticulate filler as an example.

Through the combination of different particle sizes, sintered layers are produced as shown graphically in FIG. 1. From this it is apparent that in this way it is possible to generate layers having a higher density, ultimately manifested in an improved erosion resistance.

Figure 2:
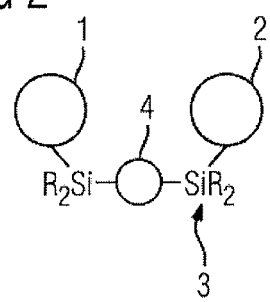
FIG. 2 shows the sintering of bimodal nanoparticles on the surface of the particles via the functional groups of the adhesion promoter.

FIG. 2 shows the sintering of bimodal nanoparticles on the surface of the particles via the functional groups of the adhesion promoter. In the present example, the adhesion promoter is a silane wherein $R_1$ can be =hydroxyl, alkoxy, halogen, glycidyloxy and $R_2$=alkyl, glycidyloxy, vinyl, propylsuccinic anhydride, methacryloyloxypropyl.

FIG. 2 shows the substitution of the radicals $R_1$ on the silane by nanoparticles of different fractions. $R_2$ can also be amidic, sulfidic, oxidic, or H. "Amidic, oxidic, and sulfidic" here means that further organic radicals $R'_2$ may be present, bonded to the silicon via nitrogen, oxygen, or sulfur.

The large particles 1 and 2 are bonded to the silicon core 3, like radicals $R_{1/2}$, and are therefore located in the immediate vicinity of one another and to the small particle 4. They are thus crosslinked via the silicon core 3.

This sintering in situ takes place on the surface of the particles. The functional groups that participate in this process may come, for example, from the series of hydroxyl, alkoxy, alkyl, vinyl, and glycidyloxy compounds. Under these high-energy conditions, however, there is no restriction on the surface functionalization, and so in general it can be assumed that all functional groups localized on the surface are involved in the sintering.

Tests research the advantages associated with use of at least bimodally distributed nanoparticulate fillers in combination with the presently employed insulating materials based on mica. For the purpose of this research, measurement is made of the lifetime of experimental specimens which correspond, in reduced-size form, to the prior art in insulated Cu conductors in stators of hydroelectric generators or turbogenerators, under electrical field loading to the point of electrical breakdown. Since the electrical strength of the insulating system under operational exposure runs to several decades, the electrical durability tests take place with multiply overdimensioned electrical field strengths.

The graphs shown in the figures represent the average values for the electrical lifetime of batches of seven test specimens under three different field exposures for a standard insulating system (mica) and for a nanoparticulate/silane filled insulating system. The unfilled systems (designated Micalastic) have a fraction of about 50 wt % mica and 50 wt % resin. The stated fraction of nanoparticles reduces the fraction of resin correspondingly. The fraction of mica remains constant in each case.

Figure 3:
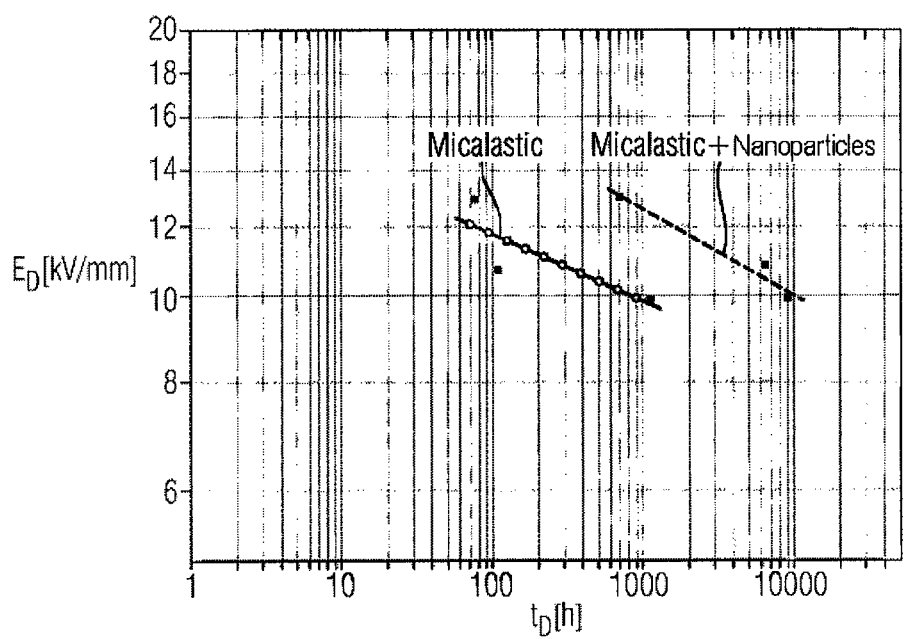
FIG. 3 is a graph representing the average values for the electrical lifetime of batches of seven test specimens under three different field exposures for both a standard insulating system (mica) and a nanoparticulate/silane filled insulating system.
Figure 4:
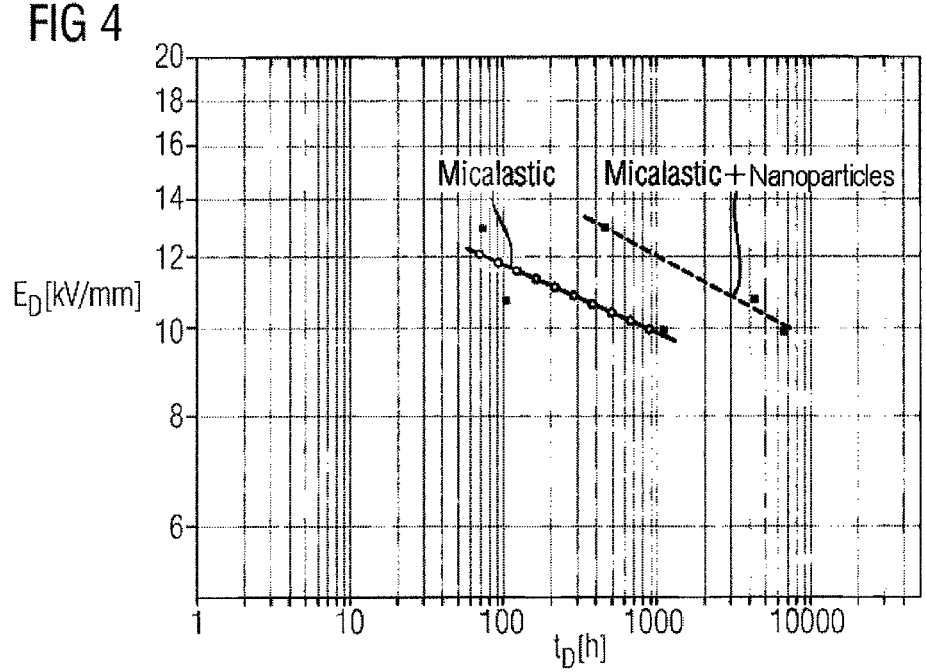
FIG. 4 shows corresponding lifetime curves for unfilled and nanoparticulate-filled high-voltage insulating systems.
Figure 5:
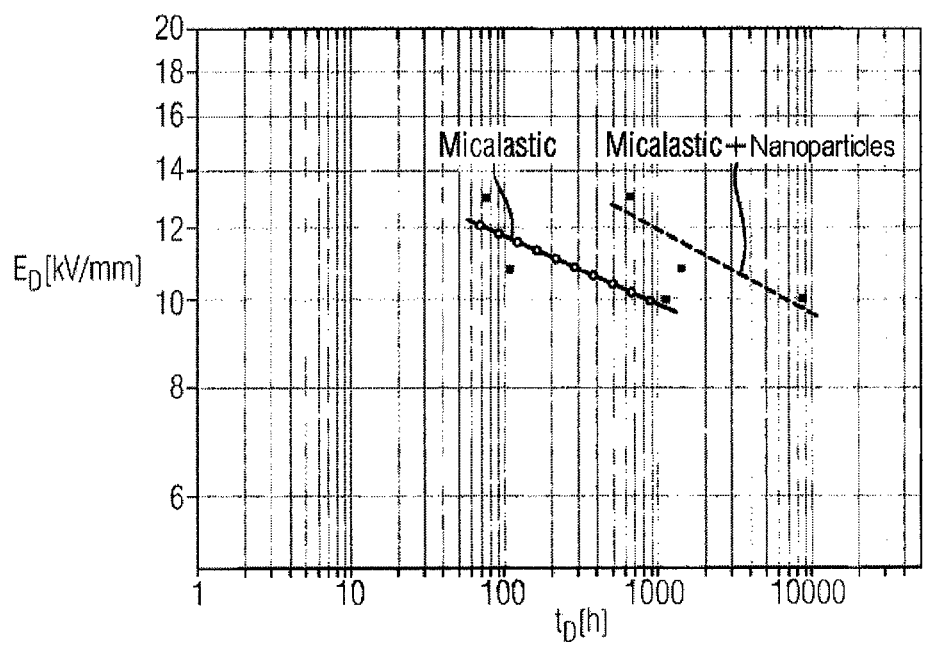
FIG. 5 shows the lifetime curves for unfilled and nanoparticulate-filled high-voltage insulating systems.

In FIGS. 3 to 5, reference samples which are experimental specimens (represented by interrupted lines with circles in between) are contrasted in each case with embodiments of the invention. The experimental specimens correspond in reduced-size form to the state of the art in respect of insulated Cu conductors in stators of hydroelectric generators or turbogenerators. They are measured under electrical field loading to the point of electrical breakdown. Since the electrical strength of the insulating system under operational exposure runs to several decades, the electrical durability tests take place with multiply overdimensioned electrical field strengths.

FIG. 3 is a graph representing the average values for the electrical lifetime of batches of seven test specimens under three different field exposures for both a standard insulating system (mica) and a nanoparticulate/silane filled insulating system. The unfilled systems (designated Micalastic) have a fraction of about 50 wt % mica and 50 wt % resin. The stated fraction of nanoparticles reduces the fraction of resin correspondingly. The fraction of mica remains constant in each case.

The lifetime curves shown in FIG. 3 for unfilled and nanoparticulate-filled high-voltage insulating systems (Micalastic (black) and Micalastic with nanoparticles 20 wt % (diameter about 20 nm, $SiO_2$) and nanoparticles 5 wt % (diameter about 5 nm, $SiO_2$) show clearly that the latter systems exhibit a significantly extended lifetime under given loading.

FIG. 4 shows corresponding lifetime curves for unfilled and nanoparticulate-filled high-voltage insulating systems (Micalastic (black) and Micalastic with nanoparticles 20 wt % (diameter about 20 nm, $SiO_2$) and nanoparticles 5 wt %

(diameter about 5 nm, $Al_2O_3$). Here again, the virtually parallel shift in lifetimes toward longer times is readily apparent.

FIG. 5 shows the lifetime curves for unfilled and nanoparticulate-filled high-voltage insulating systems (Micalastic (black) and Micalastic with nanoparticles 25 wt % (diameter about 20 nm, $SiO_2$) and nanoparticles 2.5 wt % (diameter about 5 nm, $SiO_2$).

Comparing the lifetime of each of the groups, it is found that improvements in the lifetime in the factor of up to 30 are achieved. Both lifetime profiles have the same slope, and so it appears possible to transpose the prolonged lifetime directly to operational conditions.

Insulating systems with a nanoparticulate fraction of up to 35 wt % are possible.

The invention shows for the first time the surprising erosion-inhibiting effect of nanoparticulate filler which is present bimodally. There is discussion as to whether the good results as illustrated in FIGS. 3 to 5 are attributable to a kind of particle crosslinking of the nanoparticles by agglomeration among one another. At any rate it is possible to show impressively that the admixing of a second, preferably smaller fraction of nanoparticulate filler is able to bring considerable advantages.

The invention claimed is:

1. An insulating system with improved partial discharge resistance, comprising:
   an insulating tape which is wound around an electrical conductor, the insulating tape comprising a mica tape joined to a carrier material,
   the insulating tape being impregnated with a synthetic resin, and the synthetic resin being interspersed with a nanoparticulate filler which is present bimodally, in the form of two fractions of nanoparticulate filler;
   wherein the two fractions of the nanoparticulate filler differ in their respective average particle sizes, the first fraction having an average particle size of between 10 and 50 nm and being present in a concentration of 10 to 50 wt % in the synthetic resin, and the second fraction has an average particle size of between 1 and 5 nm and is present in a concentration of 1 to 10 wt %.

2. The insulating system as claimed in claim 1, wherein a resin basis of the synthetic resin impregnated in the insulating tape is selected from the group consisting of epoxide-based resins and/or polyurethanes.

3. The insulating system as claimed in claim 1, further comprising an adhesion promoter in the synthetic resin.

4. The insulating system as claimed in claim 1, wherein at least one of the fractions of the nanoparticulate filler is of a material selected from the group consisting of metal oxides, metal nitrides, metal sulfides and/or metal carbides.

5. The insulating system as claimed in claim 1, wherein the nanoparticulate filler comprises particles having particle diameters of 0.5 nm to 80 nm.

6. The insulating system as claimed in claim 1, wherein the nanoparticulate filler is present in the synthetic resin in a concentration of between 3 and 80 wt %.

7. The insulating system as claimed in claim 3, further comprising an organosilicon compound used as the adhesion promoter.

8. The insulating system as claimed in claim 3, wherein the adhesion promoter is present in a concentration of 0.1 to 45 wt % in the synthetic resin.

9. The insulating system as claimed in claim 1, wherein the average particle diameter of the first fraction is in a range from 12 to 40 nm.

10. The insulating system as claimed in claim 9, wherein said average particle diameter is in a range from 15 to 30 nm.

11. The insulating system as claimed in claim 4, wherein at least one of the fractions of nanoparticulate filler is of a material selected from the group consisting of silicon dioxide and/or aluminum dioxide.

12. The insulating system as claimed in claim 8, wherein the adhesion promoter is present in a concentration of 1-25 wt % in the synthetic resin.

13. The insulating system as claimed in claim 5, wherein the nanoparticulate filler is present in the synthetic resin in a concentration of between 3 and 80 wt %.

14. A method for producing an insulating system having improved partial discharge resistance presented, comprising the following method steps:
   providing an insulating tape which comprises a mica paper and a carrier material, which are bonded to one another by means of an adhesive;
   enwinding an electrical conductor with the insulating tape; and
   impregnating the insulating tape wound around the conductor with synthetic resin which comprises a nanoparticulate filler, present in bimodal form, as a combination of two fractions, to form the insulating tape of claim 1.

* * * * *